(12) United States Patent
Lee et al.

(10) Patent No.: US 11,400,401 B2
(45) Date of Patent: Aug. 2, 2022

(54) FILTER DEVICE AND FILTER SYSTEM

(71) Applicant: GREENFILTEC LTD., Taoyuan (TW)

(72) Inventors: Yu-Ming Lee, Taoyuan (TW); Yu-De Lien, Taoyuan (TW)

(73) Assignee: GREENFILTEC LTD., Taoyuan (TW)

( * ) Notice: Subject to any disclaimer, the term of this patent is extended or adjusted under 35 U.S.C. 154(b) by 355 days.

(21) Appl. No.: 16/752,302

(22) Filed: Jan. 24, 2020

(65) Prior Publication Data

US 2020/0238211 A1 Jul. 30, 2020

(30) Foreign Application Priority Data

Jan. 25, 2019 (TW) ................................. 108201216
Sep. 17, 2019 (TW) ................................. 108133485

(51) Int. Cl.
*B01D 46/00* (2022.01)
*H01F 7/02* (2006.01)
*B01D 46/52* (2006.01)

(52) U.S. Cl.
CPC ..... *B01D 46/0008* (2013.01); *B01D 46/0006* (2013.01); *B01D 46/521* (2013.01);
(Continued)

(58) Field of Classification Search
CPC ............ B01D 46/0005; B01D 46/0002; B01D 46/521; B01D 46/0001; B01D 46/0006;
(Continued)

(56) References Cited

U.S. PATENT DOCUMENTS

| 10,143,952 | B2 | 12/2018 | Huang | |
| 2014/0230385 | A1* | 8/2014 | Schuld | B01D 46/521 |
| | | | | 55/481 |

(Continued)

FOREIGN PATENT DOCUMENTS

| JP | 2007-130551 A | 5/2007 |
| JP | 2011-230057 A | 11/2011 |

(Continued)

OTHER PUBLICATIONS

Japanese Office Action for Japanese Application No. 2020-010589, dated Jan. 5, 2021, with English translation.

*Primary Examiner* — Robert Clemente
(74) *Attorney, Agent, or Firm* — Birch, Stewart, Kolasch & Birch, LLP

(57) ABSTRACT

A filter device and a filter system are provided. A magnetic unit is disposed on at least one side of the filter device. The filter device includes a filter and a magnetic fixing device. The filter includes a first side wall. The magnetic fixing device includes a body, a clipping portion, and the magnetic unit. The body includes a top edge, a bottom edge, a first side face, and a second side face opposite to the first side face. The clipping portion includes a top flange extending from the top edge along the facing direction of the first side face by a first distance and a clip plate extending from an outer edge of the top flange toward the bottom edge by a second distance. The first side wall is clipped between the clip plate and the first side face. The magnetic unit is disposed on the second side face. The filter system includes a frame and the filter device.

22 Claims, 15 Drawing Sheets

(52) U.S. Cl.
CPC ..... *H01F 7/0252* (2013.01); *B01D 2265/023* (2013.01); *B01D 2265/028* (2013.01); *B01D 2279/51* (2013.01)

(58) Field of Classification Search
CPC ................ B01D 46/0008; B01D 46/10; B01D 2265/023; B01D 2265/028; B01D 2279/51; B01D 46/0013; B01D 46/62; B01D 46/645; H01F 7/0252
See application file for complete search history.

(56) References Cited

U.S. PATENT DOCUMENTS

| | | | | |
|---|---|---|---|---|
| 2015/0082988 | A1* | 3/2015 | Butler | B01D 46/523 55/497 |
| 2017/0312678 | A1* | 11/2017 | Elliott | B01D 46/10 |
| 2019/0262754 | A1* | 8/2019 | Barry | B01D 46/10 |
| 2021/0275952 | A1* | 9/2021 | Simmons | B01D 46/10 |

FOREIGN PATENT DOCUMENTS

| | | | |
|---|---|---|---|
| JP | 2013-180248 | A | 9/2013 |
| JP | 2014-217814 | A | 11/2014 |
| JP | 2016-64396 | A | 4/2016 |
| JP | 3207558 | U | 11/2016 |

* cited by examiner

FILTER DEVICE AND FILTER SYSTEM

BACKGROUND

Technical Field

The present invention relates to a filter device and a filter system; and in particular, to a filter device and a filter system erected at an air inlet of a dust-free room.

Related Art

In an industrial manufacturing field such as a semiconductor manufacturing industry, in order to further improve a product yield, a dust-free room is widely used to manufacture a product in a clean, pollution-free, and isolated environment. In order to meet environmental requirements of the dust-free room, a fan and a filter device are generally erected at an air inlet of the dust-free room, so that air flow is driven by the fan to pass through a filter of the filter device and then enters the dust-free room, thereby filtering a gaseous suspended pollutant.

The filter device erected at the air inlet of the dust-free room easily vibrates continuously due to an influence of the air flow of the fan. In this case, if a frame of the filter device cannot be tightly combined with the filter disposed therein, the gas that should be filtered leaks from a gap between the filter and the frames, resulting in a bad filtering effect. In addition, a general frame is characterized with a fixed size and low elasticity in use. What's more, the filter device is usually manufactured in a way of aluminum extrusion, which easily produces a sharp corner at an edge or a sharp edge, increasing a chance of injury to an operator during assembly.

In view of this, the present invention proposes a filter device and a filter system against a lack of the foregoing known technology to overcome the foregoing problem effectively.

SUMMARY

The present invention is intended to provide a filter device and a filter system with high air tightness.

The present invention is further intended to provide a filter device and a filter system having a frame of which a size may be changed as required.

The present invention is still further intended to provide a filter device and a filter system that may reduce an injury to an operator during manufacturing.

A magnetic unit is disposed on at least one side of the filter device of the present invention.

In an embodiment of the present invention, the filter device includes a filter and a magnetic fixing device. The filter includes a first side wall. The magnetic fixing device includes a body, a clipping portion, and the magnetic unit. The body includes a top edge, a bottom edge, a first side face and a second side face opposite to the first side face. The clipping portion includes a top flange extending from the top edge along a facing direction of the first side face by a first distance and a clip plate extending from an outer edge of the top flange toward the bottom edge by a second distance. The first side wall is clipped between the clip plate and the first side face. The magnetic unit is disposed on the second side face.

In an embodiment of the present invention, the second distance is less than a length of the body in a same direction.

In an embodiment of the present invention, the clip plate is disposed at intervals along a long edge of the body.

In an embodiment of the present invention, the body further includes a bottom flange extending from the bottom edge toward the facing direction of the first side face. The filter further includes a snap-fit member disposed on a face that is of the first side wall and that faces the first side face, the snap-fit member being engaged between the top flange and the bottom flange.

In an embodiment of the present invention, the magnetic fixing device further includes a recess disposed on the second side face, and the magnetic unit is engaged in the recess.

In an embodiment of the present invention, the magnetic fixing device further includes a top projecting strip extending from the top edge along a facing direction of the second side face. A side of the recess is formed by a bottom face of the top projecting strip.

In an embodiment of the present invention, the magnetic unit is disposed at a position adjacent to the top edge.

In an embodiment of the present invention, the magnetic fixing device further includes a guiding element. The guiding element includes a top projecting strip extending from the top edge toward the facing direction of the second side face and a guiding inclined plane extending from an outer edge of the top projecting strip toward the bottom edge and retracting toward the second side face.

In an embodiment of the present invention, the filter includes a plurality of wave structures, ridge lines of the wave structures being parallel to a direction in the first side wall extends.

In an embodiment of the present invention, the filter device further includes a supporting member disposed on the other side of the magnetic fixing device relative to the filter, the supporting member including a plate and a supporting portion. The plate includes a third side face toward the magnetic fixing device. The supporting portion extends from a position that is of the third side face of the plate and that is adjacent to a lower edge toward the filter and cross the magnetic fixing device to support the first side wall.

In an embodiment of the present invention, the supporting member further includes a slot disposed on a face opposite to the plate and the third side face, and a side face of a border has an insert that may be correspondingly inserted into the slot.

The filter system of the present invention includes a frame and the foregoing filter device. An inner side of the frame has ferromagnetism.

In an embodiment of the present invention, the filter system may be stacked.

In an embodiment of the present invention, the frame includes at least one engaging frame element and at least one ferromagnetic frame element. The engaging frame element and the ferromagnetic frame element may be engaged with each other.

In an embodiment of the present invention, top sides of each engaging frame element and each ferromagnetic frame element have a groove, and a bottom side of either of the engaging frame element and the ferromagnetic frame element may be inserted into a groove of the other engaging frame element and the ferromagnetic frame element.

In an embodiment of the present invention, there are two engaging frame elements, an end of the two engaging frame elements being disposed at two ends of one ferromagnetic frame element respectively.

In an embodiment of the present invention, the engaging frame element is L-shaped, and the ferromagnetic frame element is strip-shaped.

In an embodiment of the present invention, the filter system further includes a fixing plate disposed between the two engaging frame elements, and located at the other opposite end at which the two engaging frame elements are connected to the ferromagnetic frame element.

In an embodiment of the present invention, there are two engaging frame elements and two ferromagnetic frame elements.

In an embodiment of the present invention, the two engaging frame elements are U-shaped, and the two ferromagnetic frame elements are strip-shaped, the U-shaped engaging frame elements being disposed corresponding to each other, and the two ferromagnetic frame elements being connected to the two U-shaped engaging frame elements respectively to form a rectangular frame.

In an embodiment of the present invention, corresponding tenons are disposed at connecting ends of the engaging frame element and the ferromagnetic frame element respectively, so that the engaging frame element and the ferromagnetic frame element may be correspondingly engaged.

In an embodiment of the present invention, a fixing groove is further disposed at an inner wall of the frame and close to a bottom to fix a filter to the frame using a fixing element embedded in the fixing groove.

In an embodiment of the present invention, the frame includes a plurality of borders and a plurality of connecting members. Two ends of each border have insertion ports respectively. The plurality of connecting members are connected to the plurality of borders, each connecting member including a connecting body, a first inserting member, and a second inserting member. The first inserting member extends outward from one side of the connecting member body. The second inserting member extends outward from the other side of the connecting member body and forms an angle with the first inserting member. The first inserting member and the second inserting member of the connecting member are inserted into the insertion ports at one end of two adjacent borders respectively to connect the two adjacent borders.

In an embodiment of the present invention, a groove is disposed on a top side of each border, a bottom side of one of the borders being inserted into the groove of the other border.

DETAILED DESCRIPTION

A filter device of the present invention is disposed in a frame. Further, the filter device and the frame constitute a filter system. In other words, the filter system includes the frame and the filter device.

Figure 1:
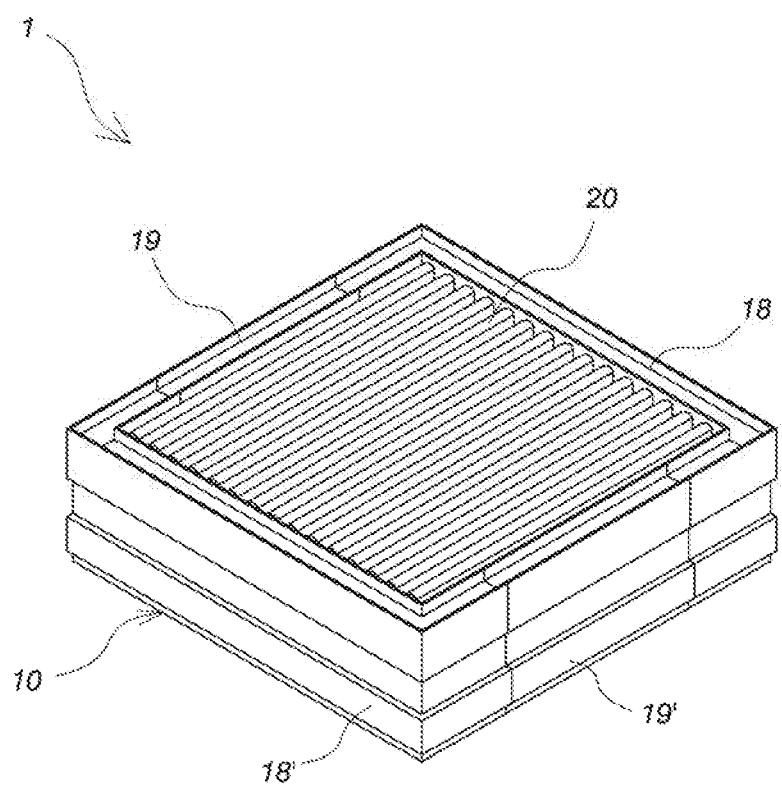
FIG. 1 is a schematic diagram of an embodiment of a filter system according to the present invention.
Figure 2:
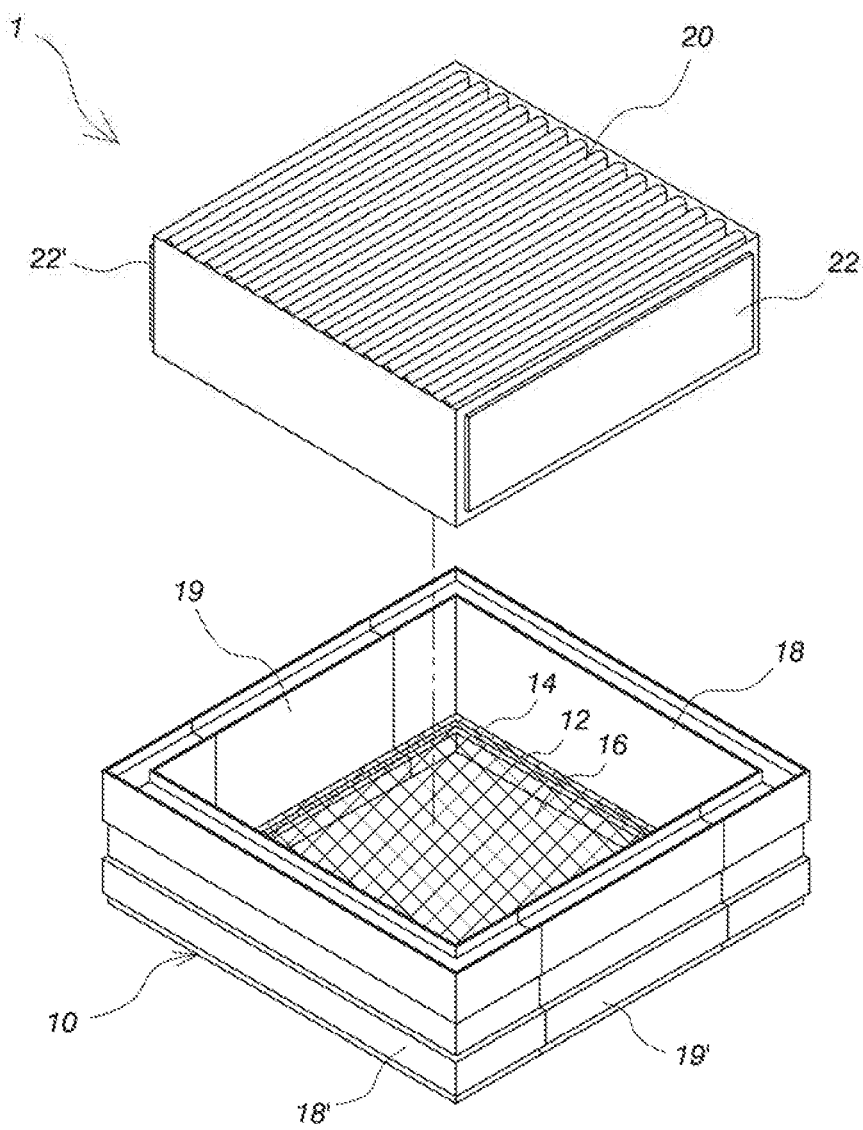
FIG. 2 is a schematic assembly diagram of the embodiment of the filter system according to the present invention.

More specifically, in the embodiment shown in FIG. 1 and FIG. 2, the filter system 1 includes a frame 10 and a filter device 20. In this embodiment, for example, the frame 10 is a rectangular frame. A fixing groove 12 is further disposed in an inner wall and close to a bottom of the frame 10 to fix a filter 16 to the frame 10 using a fixing element 14, such as a rubber fixing strip, embedded into the fixing groove 12. The filter 16 is configured to filter out large particles of a gaseous suspended pollutant, and the filter device 20 may be further disposed in the frame 10. The filter device 20 is configured to filter out a slightly small gaseous suspended pollutant.

The frame may include at least one engaging frame element and at least one ferromagnetic frame element. The engaging frame element and the ferromagnetic frame element may be engaged with each other. In embodiments shown from FIG. 1 to FIG. 3, in the embodiments, the frame 10 includes two engaging frame elements 18, 18' and two ferromagnetic frame elements 19, 19'. The engaging frame elements 18, 18' may be aluminium-engaging frame elements or stainless-steel-engaging frame elements. The two engaging frame elements 18, 18' are both U-shaped engaging frame elements. A tenon 180 and a mortise 182 are disposed on two ends of the engaging frame element 18 respectively, and a tenon 180' and a mortise 182' are disposed on two ends of the engaging frame element 18' respectively. The two ferromagnetic frame elements 19, 19' may be iron ferromagnetic frame elements, nickle ferromagnetic frame elements, or cobalt ferromagnetic frame elements, and the two ferromagnetic frame elements 19, 19' are strip-shaped ferromagnetic frame elements. A tenon 190 and a mortise 192 are disposed on two ends of the ferromagnetic frame elements 19 respectively, and a tenon 190' and a mortise 192' are also disposed on two ends of the ferromagnetic frame elements 19' respectively. The ferromagnetic frame elements 19, 19' may be changed to ferromagnetic frame elements 19, 19' of a different length as required.

Figure 3:
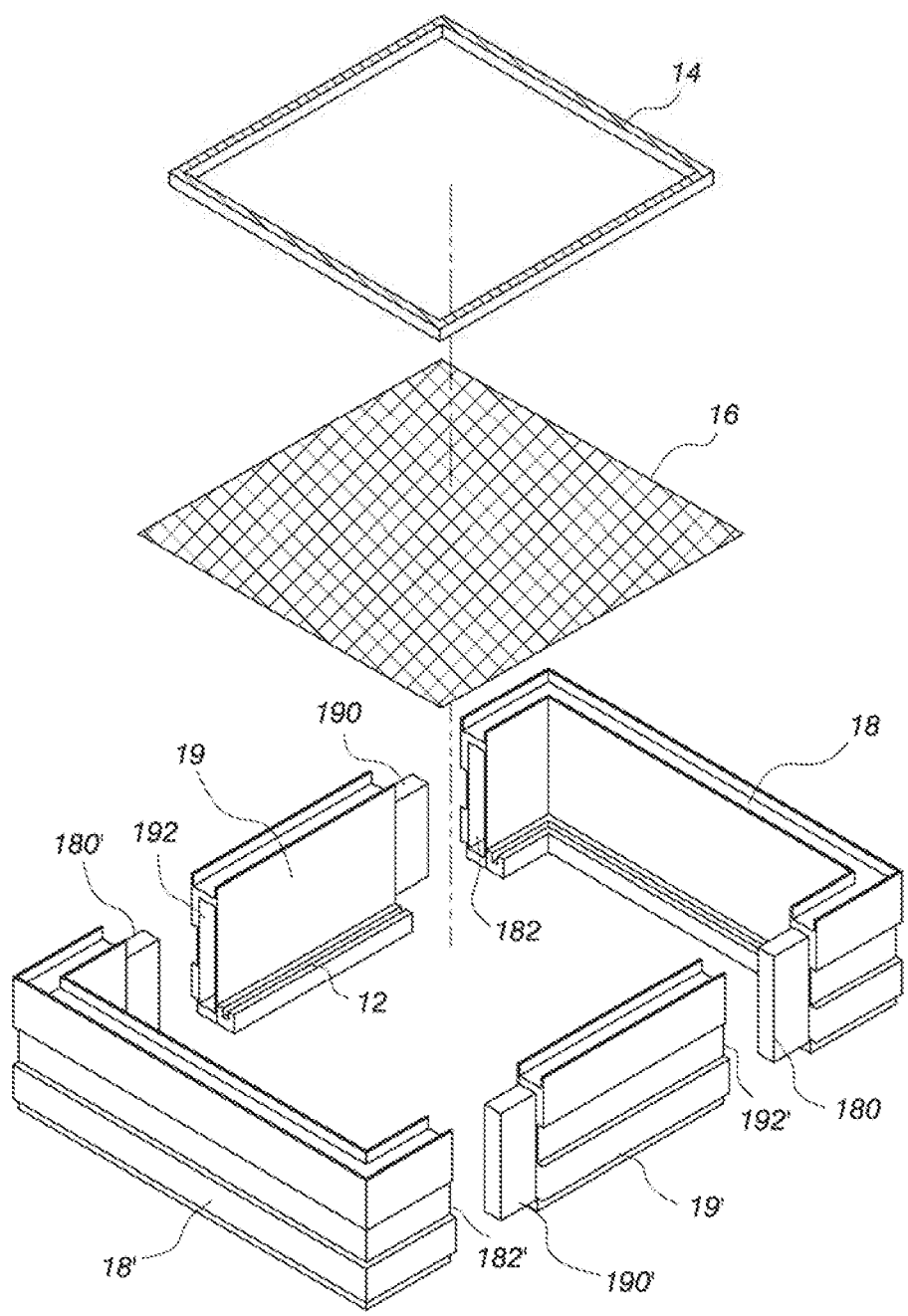
FIG. 3 is a schematic exploded diagram of an embodiment of a frame according to the present invention.

In the embodiments shown in FIG. 2 and FIG. 3, when the two engaging frame elements 18, 18' and the two ferromagnetic frame elements 19, 19' are connected to form the rectangular frame 10, the two U-shaped engaging frame elements 18, 18' are disposed corresponding to each other, and the two striped ferromagnetic frame elements 19, 19' are connected to the two U-shaped engaging frame elements 18, 18' respectively. In particular, the tenon 180 of the engaging frame element 18 is connected to the mortise 192' of the ferromagnetic frame element 19', and the mortise 182 of the engaging frame element 18 is connected to the tenon 190 of the ferromagnetic frame element 19, the tenon 180' of the engaging frame element 18' is connected to the mortise 192 of the ferromagnetic frame element 19, and the mortise 182' of the engaging frame element 18' is connected to the tenon 190' of the ferromagnetic frame element 19'. Therefore, two ends of the two engaging frame elements 18, 18' are connected to the two ferromagnetic frame elements 19, 19' respectively to form the rectangular frame 10. Because the frame 10 of this embodiment is detachable, and the ferromagnetic frame elements 19, 19' may be changed to ferromagnetic frame elements 19, 19' of a different length as required, for the frame 10 of this embodiment, a size of the frame 10 may be arbitrarily adjusted depending on the length of the ferromagnetic frame elements 19, 19'.

In the embodiment shown in FIG. 2, a magnetic unit 22 is disposed on at least one side of the filter device 20 disposed in the frame 10. The magnetic unit 22 may be magnet. In this embodiment, for example, magnetic units 22, 22' are disposed on two corresponding sides of the filter device 20 respectively. In addition, when the filter device 20 is disposed in the frame 10, the two sides that are of the filter device 20 and are provided with the magnetic units 22, 22' may be correspondingly adsorbed on the two ferromagnetic frame elements 19, 19' of the frame 10.

It can be known from the above that due to magnetic attraction between the filter device 20 and the frame 10 in this embodiment, the filter device 20 and the frame 10 may be tightly combined, to effectively prevent air to be filtered from flowing out from a gap between the filter device 20 and the frame 10. In addition, because the frame 10 of this embodiment is detachable, and the length of the ferromagnetic frame elements 19, 19' may be selected as required, the frame 10 may be changed to a frame of any size to coincide with the filter device 20 of different sizes.

In a different embodiment, the frame may vary in consideration of design, manufacturing, or use. In the embodiment shown in FIG. 4 and FIG. 5, the filter system 3 includes a frame 30. In this embodiment, for example, the frame 30 is a U-shaped frame. A fixing groove 32 is further disposed in an inner wall and close to a bottom of the frame 30 to fix a filter 36 to the frame 30 using a fixing element 34, such as a rubber fixing strip, embedded into the fixing groove 32. The filter 36 is configured to filter out large particles of a gaseous suspended pollutant, and a filter device 40 may be further disposed in the frame 30 to filter out a slightly small gaseous suspended pollutant.

Figure 4:
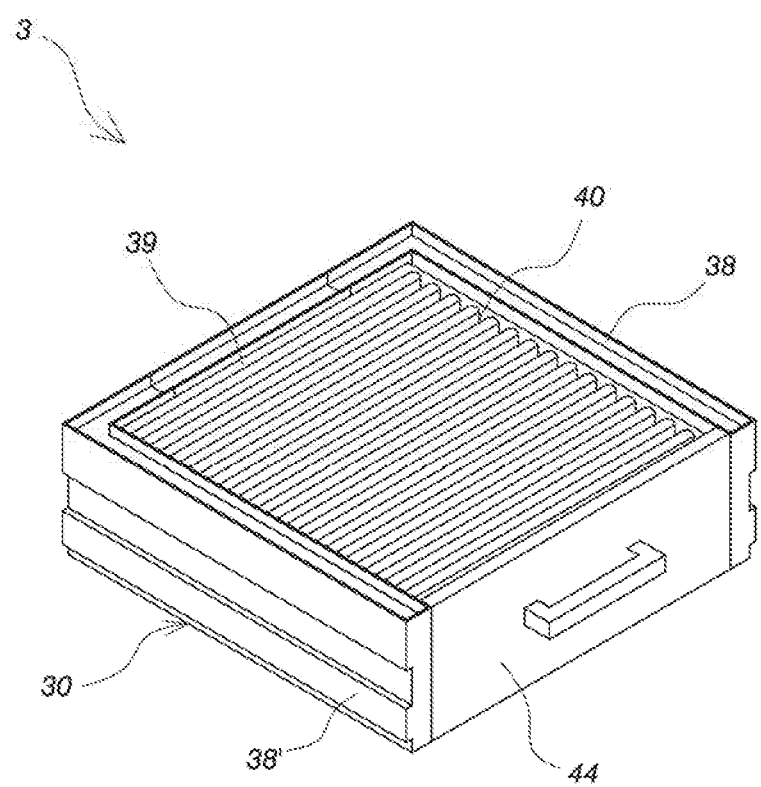
FIG. 4 is a schematic diagram of a different embodiment of a filter system according to the present invention.
Figure 5:
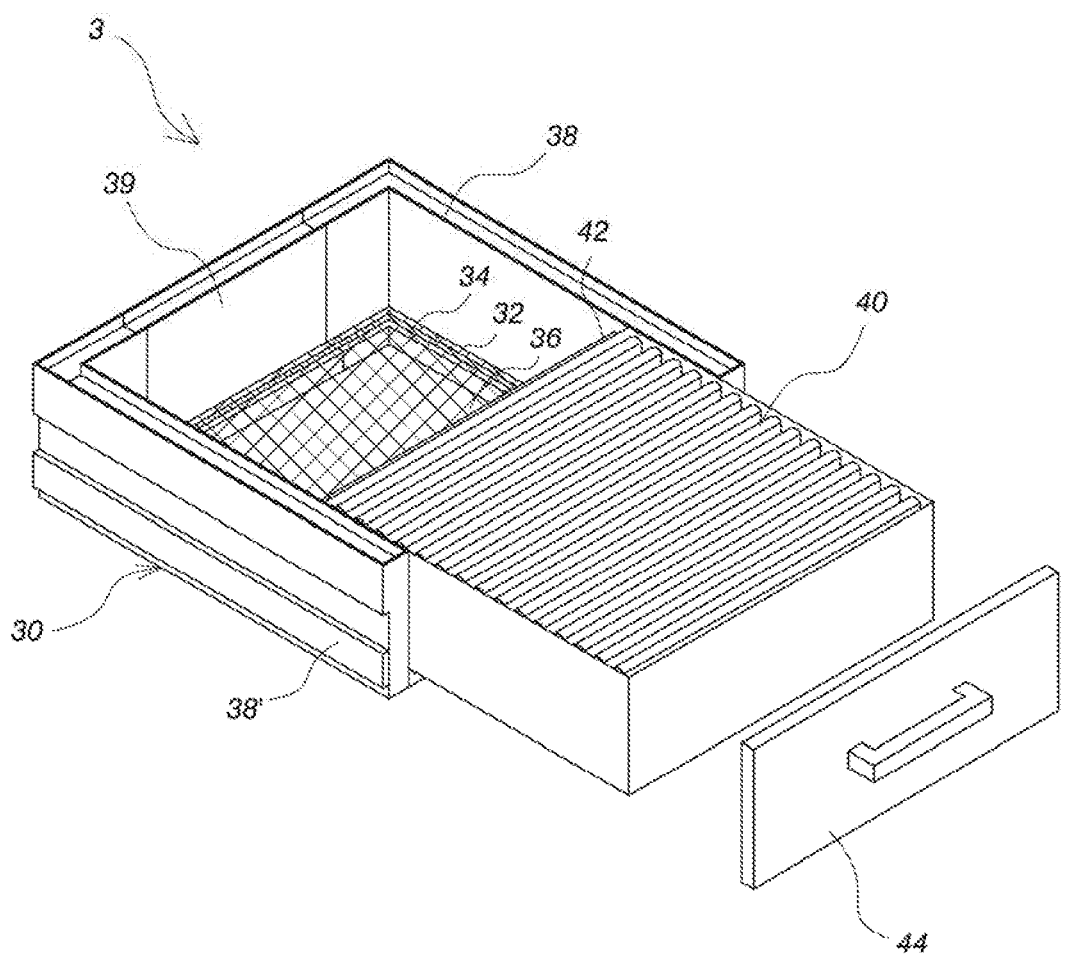
FIG. 5 is a schematic assembly diagram of the different embodiment of the filter system according to the present invention.
Figure 6:
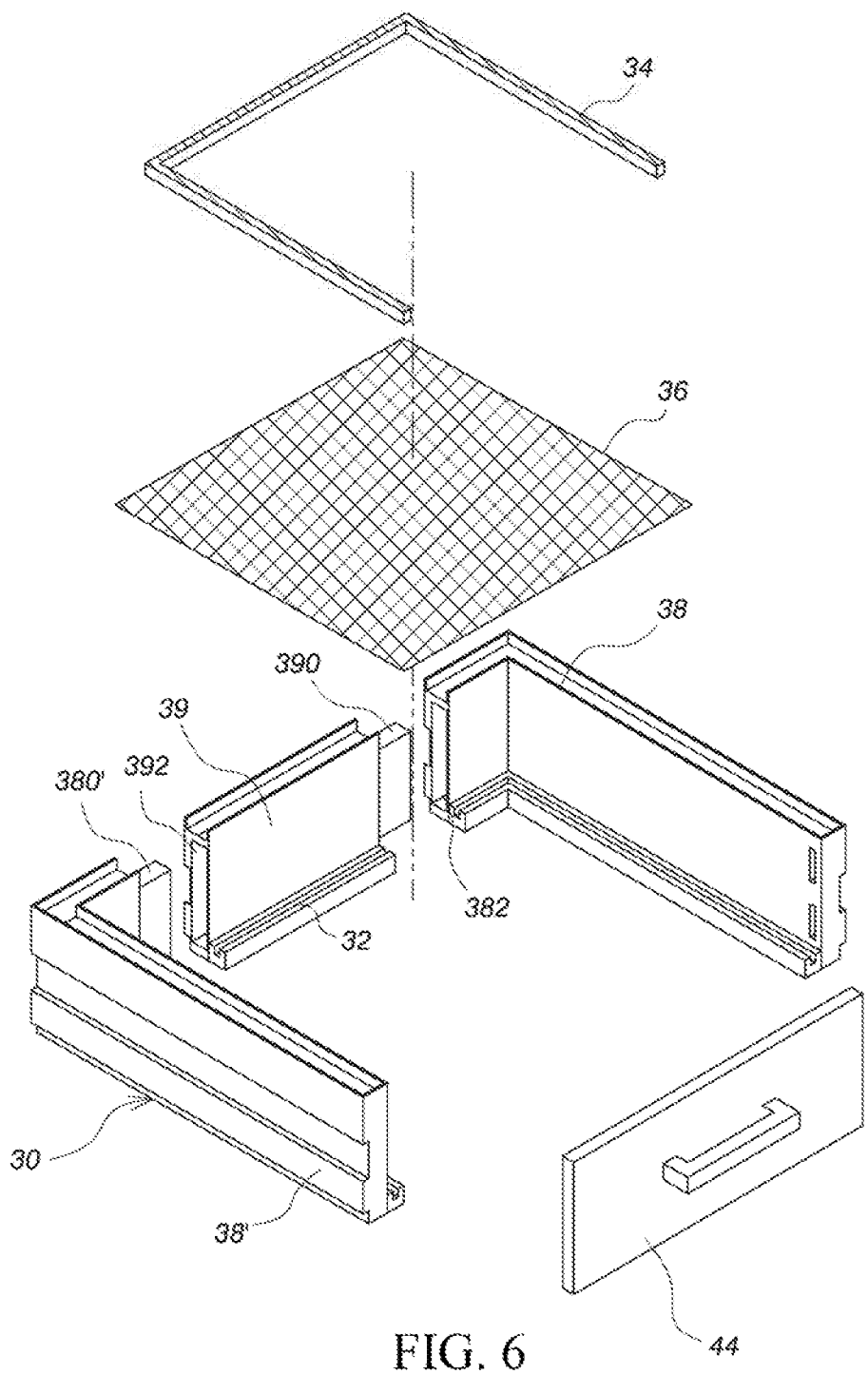
FIG. 6 is a schematic exploded diagram of a different embodiment of the frame according to the present invention.

In embodiments shown from FIG. 4 to FIG. 6, the frame 30 includes two engaging frame elements 38, 38' and one ferromagnetic frame element 39. The engaging frame elements 38, 38' may be aluminium-engaging frame elements or stainless-steel engaging frame elements, and the two engaging frame elements 38, 38' are L-shaped engaging frame elements. A mortise 382 is disposed at one end of the engaging frame element 38, and a tenon 380' is disposed at an end of the engaging frame element 38'. The ferromagnetic frame element 39 may be an iron ferromagnetic frame element, a nickel ferromagnetic frame element, or a cobalt ferromagnetic frame element. In this embodiment, for example, the ferromagnetic frame element 39 is a strip-shaped ferromagnetic frame element. A tenon 390 and a mortise 392 are respectively disposed at two ends of the ferromagnetic frame element 39. The ferromagnetic frame element 39 may be changed to a ferromagnetic frame element 39 of a different length as required.

In the embodiment shown in FIG. 5, when the two engaging frame elements 38, 38' and one ferromagnetic frame element 39 are connected to form a U-shaped frame 30, two L-shaped engaging frame elements 38, 38' are disposed at two ends of the ferromagnetic frame element 39 respectively, so that the tenon 390 of the ferromagnetic frame element 39 is connected to the mortise 382 of the engaging frame element 38, the mortise 392 at the other end of the ferromagnetic frame element 39 is connected to the tenon 380' of the engaging frame element 38'. Therefore, either end of the two engaging frame elements 38, 38' is disposed at the two ends of the ferromagnetic frame element 39 respectively to form the U-shaped frame 30.

In the embodiment shown in FIG. 4 and FIG. 5, a magnetic unit 42 is disposed at a side of the filter device 40 disposed in the frame 30. The magnetic unit 42 may be magnet. When the filter device 40 is disposed in the frame 30, a side that is of the filter device 40 and that is provided with the magnetic unit 42 may be correspondingly absorbed on the ferromagnetic frame element 39 of the frame 30. In addition, a fixing plate 44 is disposed between the two engaging frame elements 38 and 38', and is located at an opposite end at which the two engaging frame elements 38, 38' are connected to the ferromagnetic frame element 39 to fix the filter device 40 in the frame 30.

It can be known from the above that due to magnetic attraction between the filter device 40 and the frame 30 in this embodiment, the filter device 40 and the frame 30 may be tightly combined, to effectively prevent air to be filtered from flowing out from a gap between the filter device 40 and the frame 30. In addition, because the frame 30 of this embodiment is detachable, and the ferromagnetic frame element 39 of a different length may be selected as required, the frame 30 of this embodiment may be changed to a frame of any size to coincide with the filter device 40 of different sizes.

Figure 7:
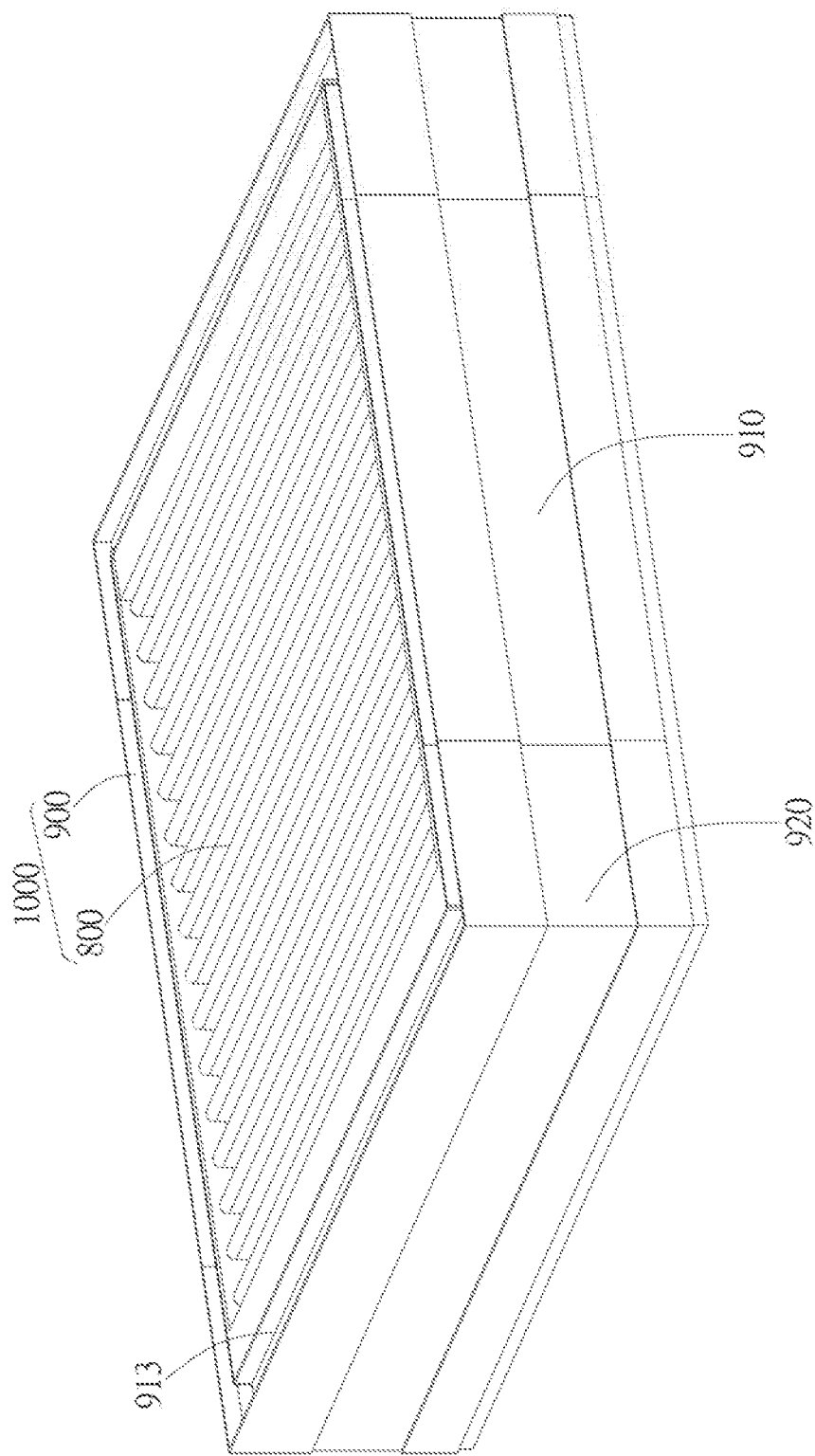
FIG. 7 is a schematic diagram of a different embodiment of the filter system according to the present invention.

In a different embodiment, the filter device may vary in consideration of design, manufacturing, or use. More specifically, in the embodiment shown in FIG. 7 and FIG. 8, a filter system 1000 includes a filter device 800 and a frame 900. An inner side 901 of the frame 900 is ferromagnetic or may be absorbed by a magnet. The filter device 800 includes a filter 100 and a magnetic fixing device 200. The filter 100 includes a first side wall 110. In an embodiment shown in FIG. 9, the magnetic fixing device 200 includes a body 300, a clamping portion 400, and a magnetic unit 500. The body 300 includes a top edge 311 and a bottom edge 312, a first side face 321 and a second side face 322 opposite to the first side face. More specifically, in this embodiment, the body 300 is a rectangular sheet, and an upper long edge and a lower long edge are the top edge 311 and the bottom edge 312 respectively, and two opposite sides are the first side face 321 and the second side face 322 respectively.

Figure 9:
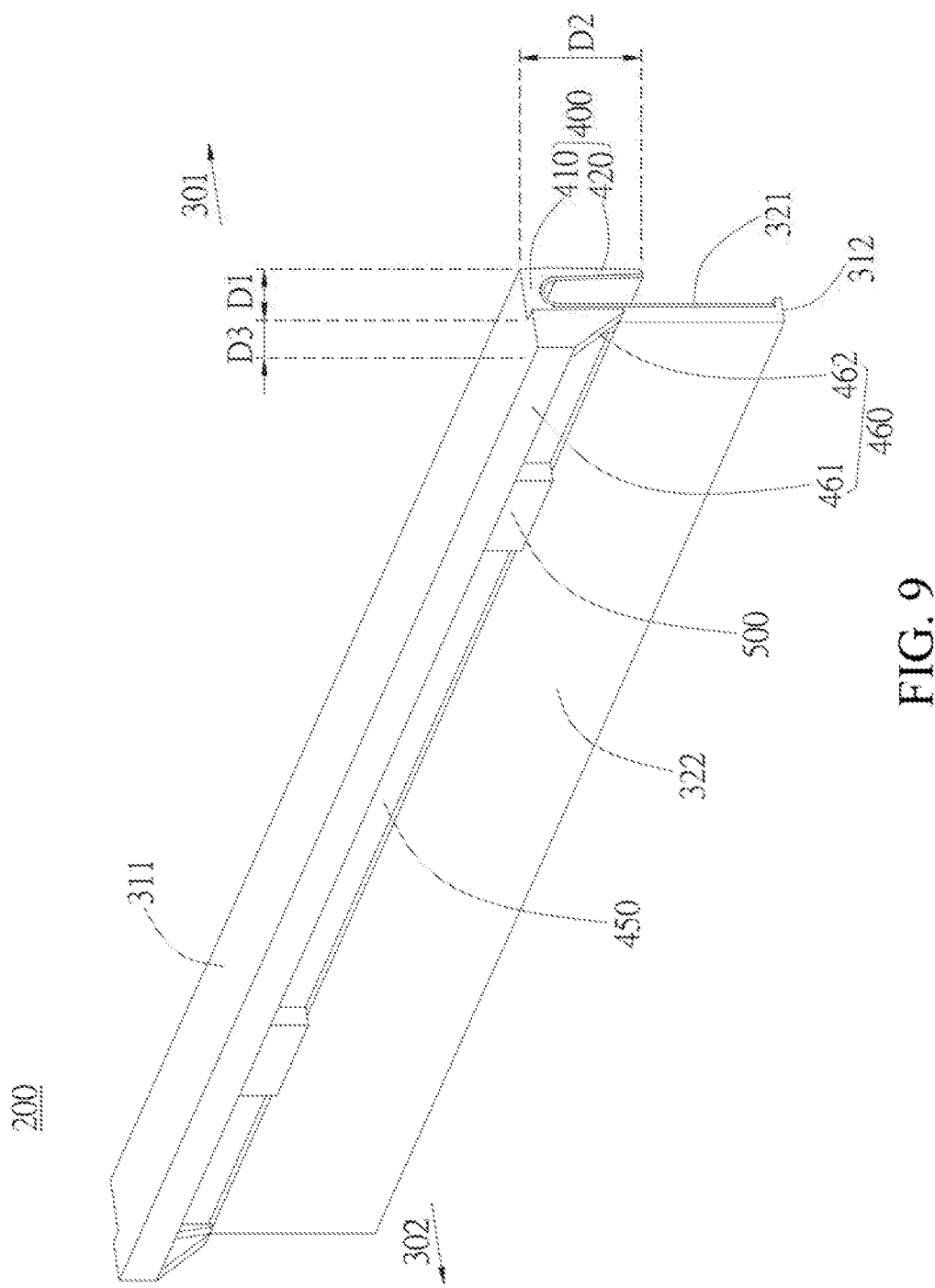
FIG. 9 is a schematic diagram of an embodiment of a magnetic fixing device according to the present invention.

In the embodiment shown in FIG. 9, the clipping portion 400 includes a top flange 410 extending from the top edge 311 along a facing direction 301 of the first side face 321 by a first distance D1 and a clip plate 420 extending from an outer edge of the top flange 410 toward the bottom edge 312 by a second distance D2. The second distance D2 is smaller than a length of the body 300 in a same direction. The first side wall 110 is clipped between the clip plate 420 and the first side face 321. The clip plate 420 is disposed at intervals along a long edge of the body 300. The body 300 may have greater rigidity than that of the first side wall 110 to facilitate the clamping of the first side wall 110, and the body may be made of a material such as an acrylonitrile-butadiene-styrene (ABS) copolymer.

Figure 10:
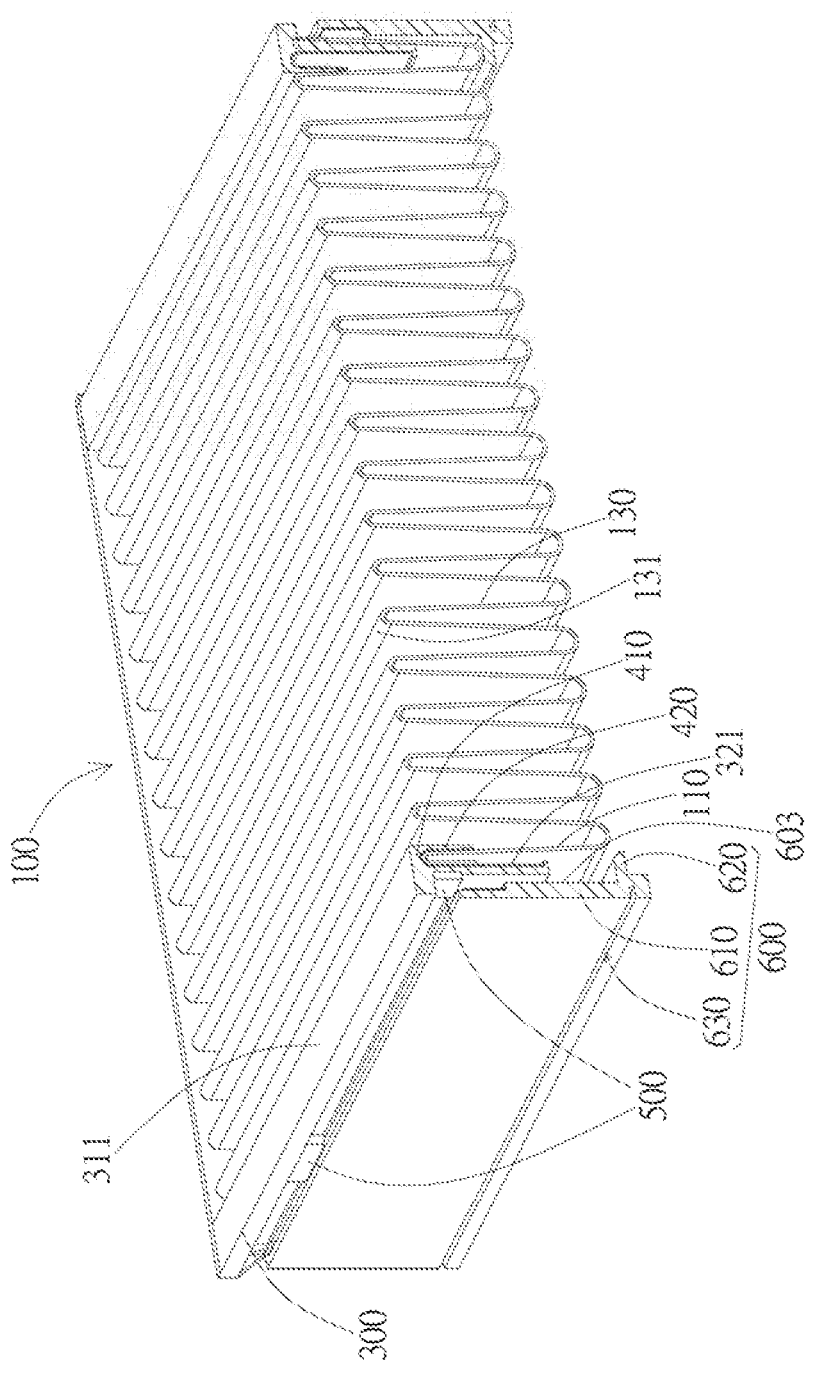
FIG. 10 is a schematic three-dimensional profile diagram of an embodiment of a filter device according to the present invention.
Figure 11:
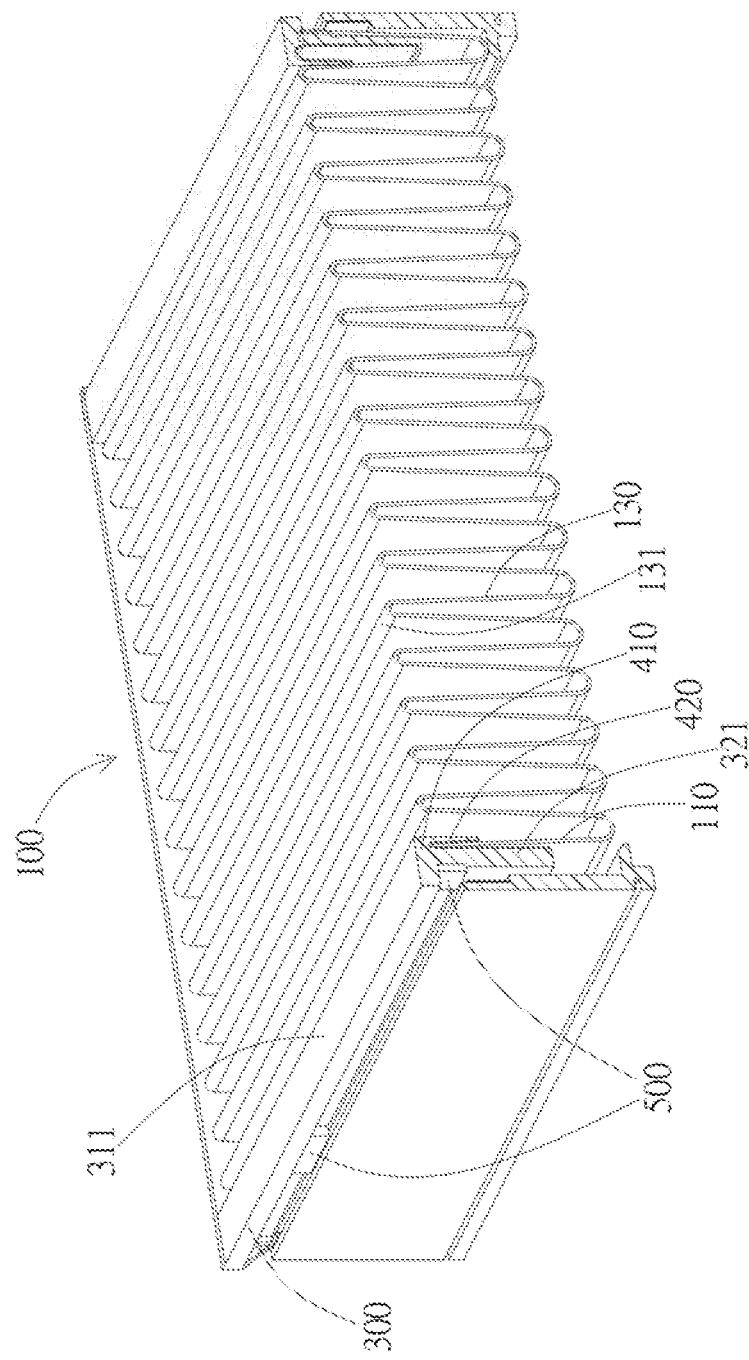
FIG. 11 is schematic three-dimensional profile diagram of a different embodiment of the filter device according to the present invention.

More specifically, in an embodiment shown in FIG. 10, the filter 100 includes a plurality of wave structures 130. Ridge lines 131 of the wave structures 130 is parallel to a direction in which the first side wall 110 extends. The first side wall 110 may extend between the clip plate 420 and the first side face 321 to be clamped. Seen from a different view, the magnetic fixing device 200 spans on a top of the first side wall 110 through the top flange 410. The first side wall 110 may be folded appropriately to increase a thickness thereof for easy clamping. As shown in FIG. 11, during manufacturing, a distance between the clip plate 420 and the first side face 321 is approximately equal to the thickness of the first side wall 110 for easy clamping.

Figure 12:
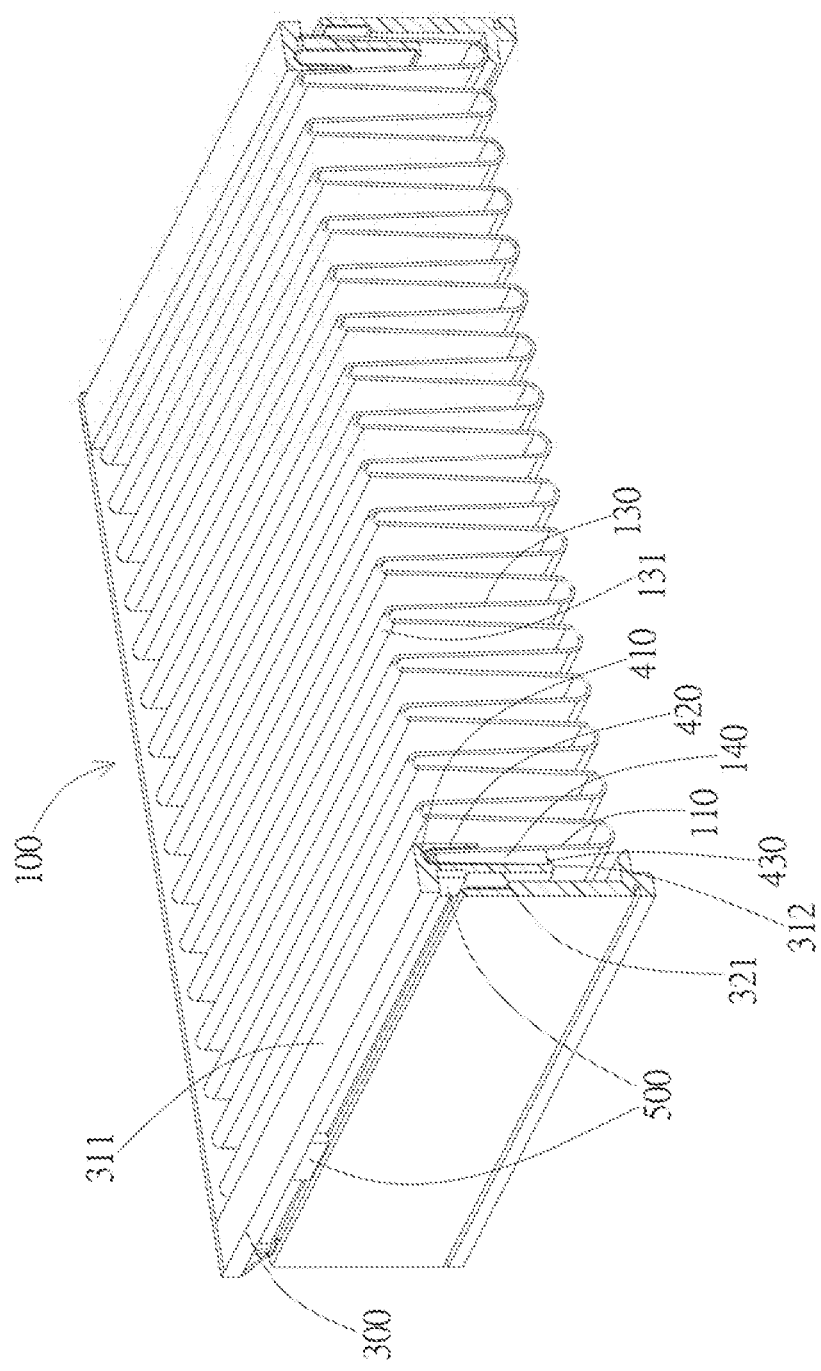
FIG. 12 is schematic three-dimensional profile diagram of a different embodiment of the filter device according to the present invention.
Figure 13:
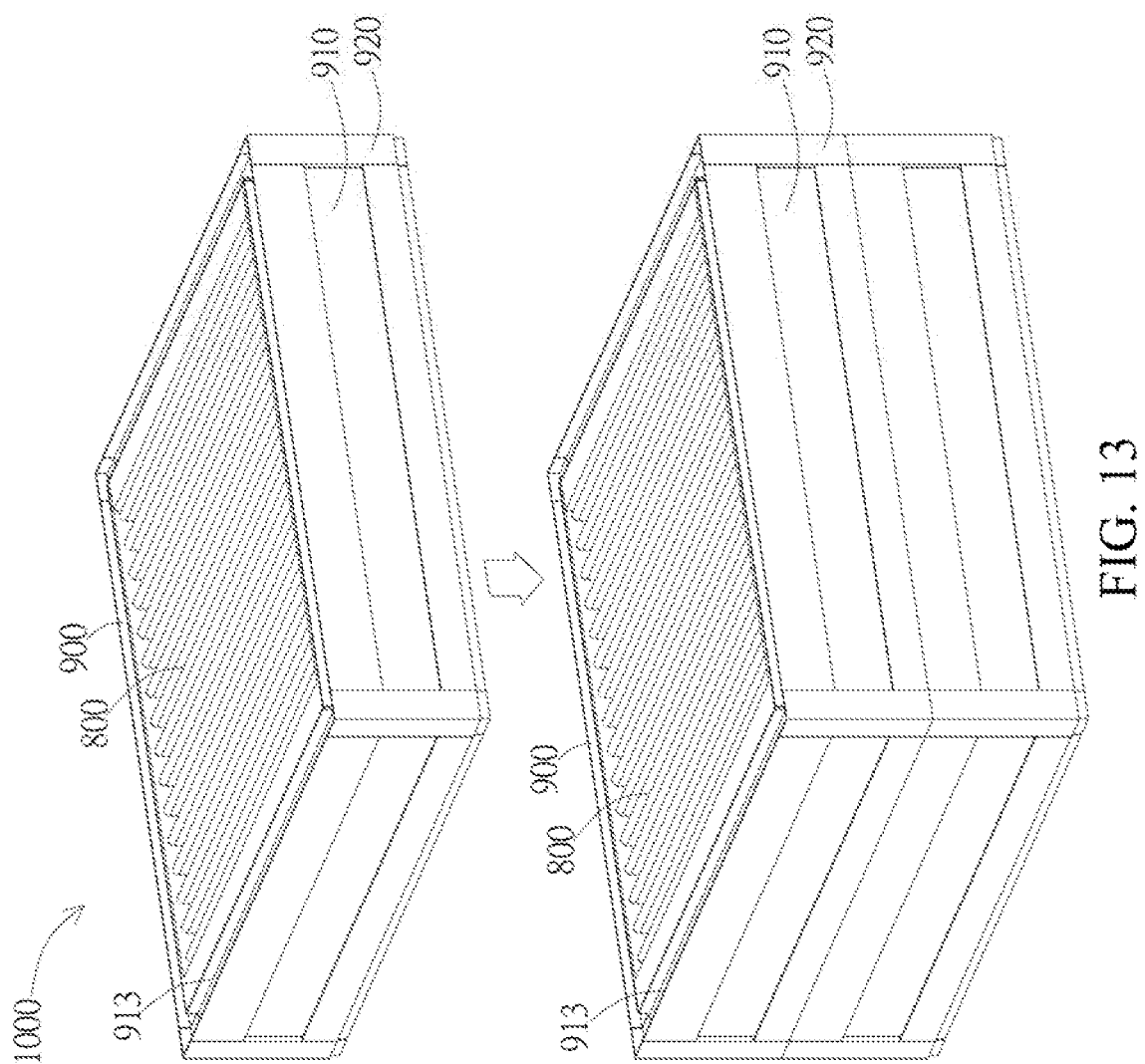
FIG. 13 is a schematic diagram of an embodiment of stacking of the filter system according to the present invention.

In a different embodiment, an element may be further added to the filter 100 to be engaged by the magnetic fixing device 200. In an embodiment shown in FIG. 12, the filter 100 further includes a snap-fit member 140 disposed at a face that is of a first side wall 110 and faces a first side face 321. A body 300 further includes a bottom flange 430 extending from a bottom edge 312 toward a facing direction of the first side face 321. The snap-fit member 140 is engaged between a top flange 410 and the bottom flange 430. The snap-fit member 140 is preferably a rectangular sheet, and is harder or has better rigidity than that of the first side wall 110, and therefore may provide a relatively firm snap-fit relationship.

Figure 8:
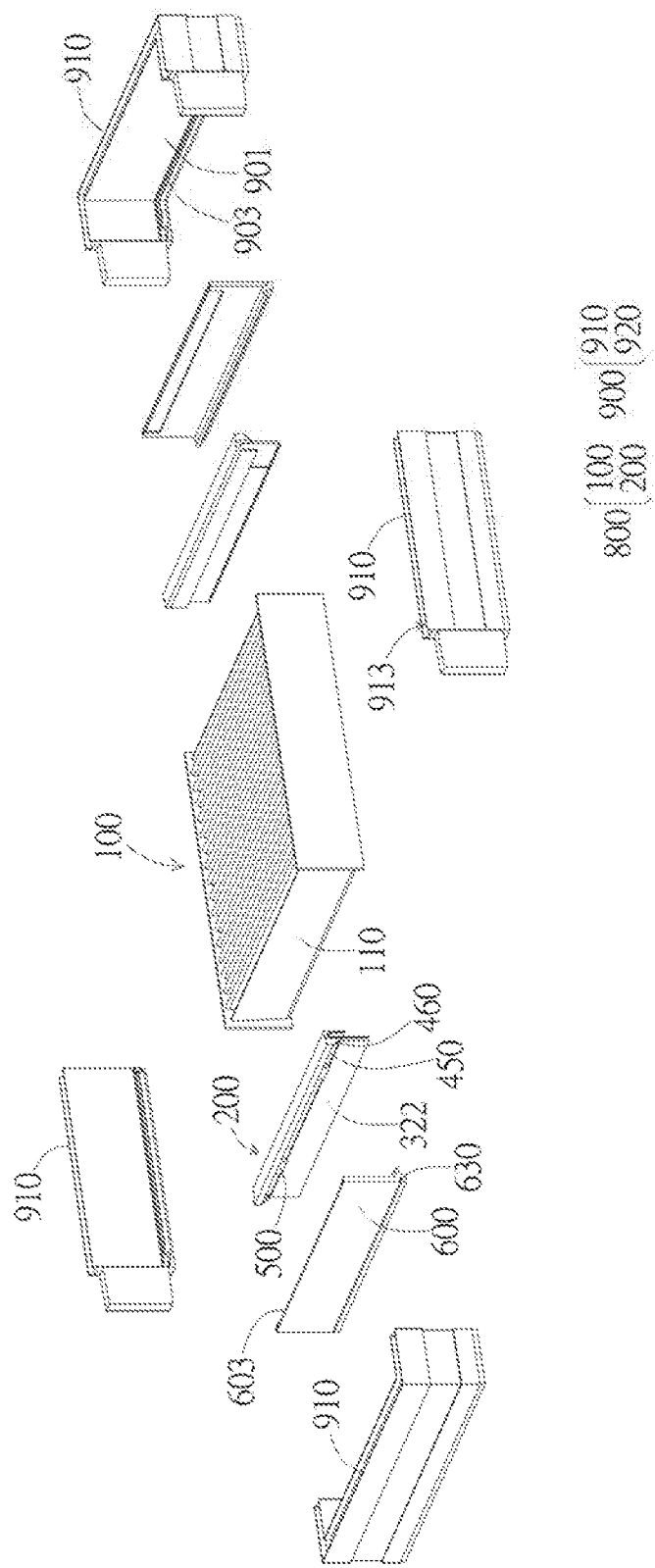
FIG. 8 is a schematic exploded diagram of a different embodiment of the filter system according to the present invention.

In the embodiment shown in FIG. 8, the magnetic unit 500 is disposed on the second side face 322 and is adsorbed on the inner side 901 correspondingly, thereby reducing a gap between the filter 100 and the frame 900 and increasing air tightness. The magnetic fixing device 200 preferably includes a recess 450 and is disposed on the second side face 322. The magnetic unit 500 is engaged in the recess 450 to facilitate alignment and increase fixation during assembly, and further reduce an overall thickness of the magnetic fixing device 200. In a different embodiment, the magnetic unit 500 may be disposed at intervals or be disposed in a whole strip. The magnetic unit 500 may be disposed on the second side face 322 without the recess 450 disposed at the magnetic fixing device 200. In this embodiment, the magnetic fixing device 200 includes a top projecting strip 461 extending from the top edge 311 along a facing direction 302 of the second side face 322. A side of the recess 450 is formed by a bottom face of the top projecting strip 461.

The magnetic unit 500 is preferably disposed at a position close to the top edge 311, so that the magnetic fixing device 200 and the filter 100 are placed downward in a frame 900. The 'close' generally refers to, for example, a position higher than a half of or about ¼ of the body 300. In addition, the magnetic fixing device 200 may further include a guiding element 460. The guiding element includes a top projecting strip 461 extending from the top edge 311 toward the facing direction 302 of the second side face 322 by a third distance D3 and a guiding inclined plane 462 extending from an outer edge of the top projecting strip 461 toward the bottom edge 312 and retracting toward the second side face 322. The magnetic fixing device 200 and the filter 100 may be smoothly placed downward in the frame 900 through guiding by the guiding inclined plane 462 of the guiding element 460.

In the embodiments shown in FIG. 8 and FIG. 10, the filter device 800 further includes a supporting member 600 disposed on the other side of the magnetic fixing device 200 relative to the filter 100. The supporting member 600 includes a plate 610 and a supporting portion 620. The plate 610 includes a third side face 603 facing the magnetic fixing device 200. The supporting portion 620 extends from a position that is of the third side face 603 of the plate 610 and that is adjacent to a lower edge toward the filter 100 and cross the magnetic fixing device 200 to support the first side wall 110. In an embodiment, the supporting member 600 further includes a slot 630 disposed on a face opposite to the plate 610 and the third side face 603, and a side face of a border 910 has an insert 903 that may be correspondingly inserted into the slot 630. Further, the border 910 of the frame 900 fixes the supporting member 600 through the insert 903 being inserted into the slot 630, and further supports the first side wall 110 through the supporting portion 620 of the supporting member 600, so that the filter 100 is supported by the frame 900.

Figure 14:
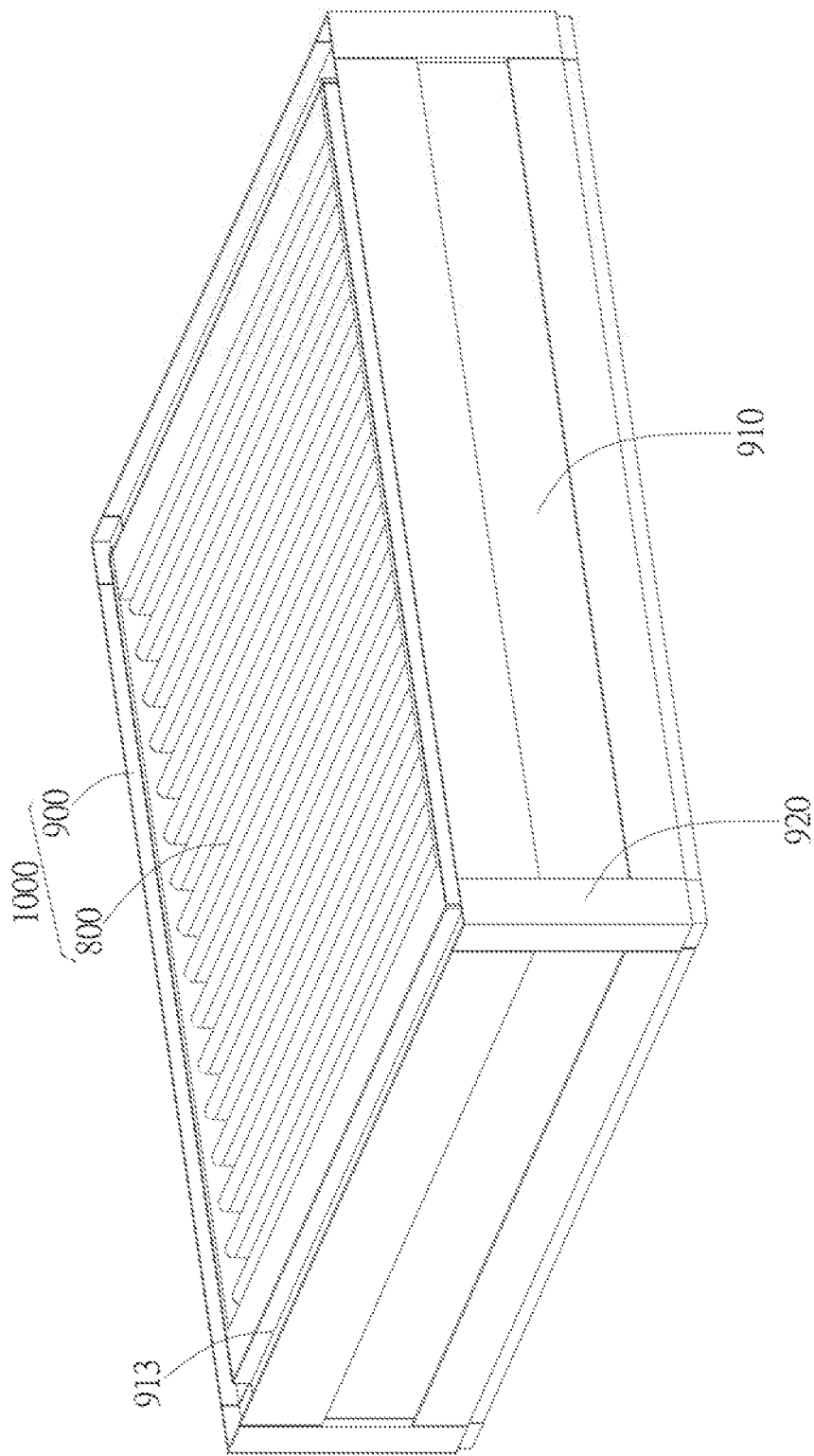
FIG. 14 is a schematic diagram of a different embodiment of the filter system according to the present invention.

The filter system may be preferably stacked. Further, the filter system may achieve a stacking effect through a groove on the top of the frame. More specifically, in an embodiment shown in FIG. 14, a top side of each border 910 has a groove 913. A bottom side of one of the borders 910 may be inserted into a groove 913 of the other border 910, so that the filter system 1000 may be stacked. Accordingly, elasticity in use may be increased, for example, filter systems using different filters are stacked to increase types of filtered gaseous suspended pollutants, or filter systems using a same filter are stacked to increase a filtering effect.

Figure 15:
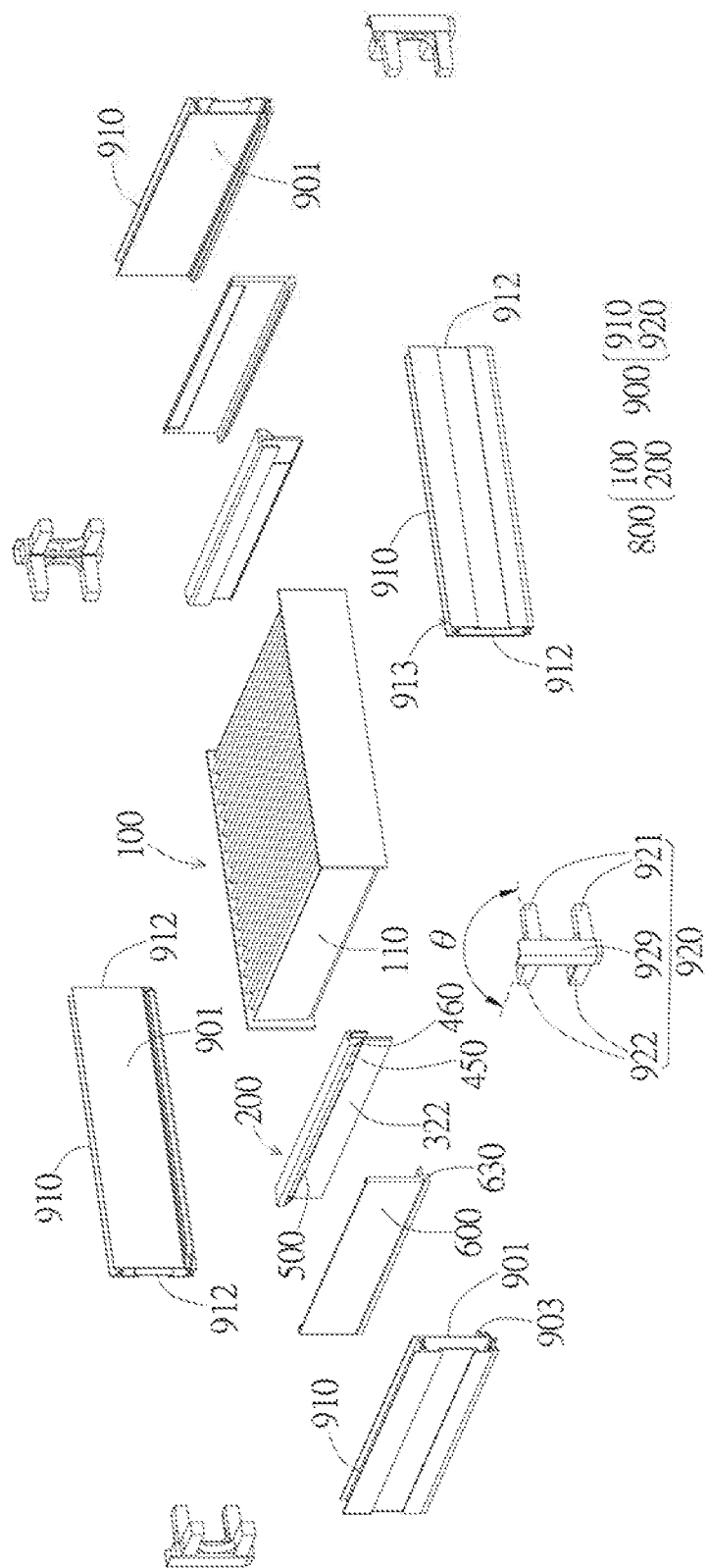
FIG. 15 is a schematic exploded diagram of a different embodiment of the filter system according to the present invention.

In a different embodiment shown in FIG. 15, the frame 900 includes a plurality of borders 910 and a plurality of connecting members 920. Two ends of each border 910 have insertion ports 912 respectively. The plurality of connecting members 920 are connected to the plurality of borders 910, each connecting member 920 including a connecting member body 929, a first inserting member 921, and a second inserting member 922. The first inserting member 921 extends outward from a side of the connecting member body 929. The second inserting member 922 extends outward from the other side of the connecting member body 929 and forms an angle θ with the first inserting member 921. The angle θ is preferably 90°. However, in a different embodiment, the angle may be different in consideration of use and manufacturing, etc. The first inserting member 921 and the second inserting member 922 of the connecting member 920 are inserted into the insertion ports 912 at one end of two adjacent borders 910 respectively to connect the two adjacent borders 910.

In an embodiment, the border 910 is an aluminium-extrusion element. Therefore, a sharp corner at an edge or a sharp edge is easily caused, increasing a chance of injury to an operator during assembly. The connecting member 920 made of, for example, a polymer, is configured to connect two adjacent borders 910, to reduce exposure to the sharp corner or the sharp edge, thereby reducing a risk of injury to the operator.

Based on the foregoing, the filter device of the present invention may reduce separation of the filter with an outer frame through magnetic absorption and increase overall air tightness. A commercially available filter provided with the magnetic fixing device may directly form a filter device with a side wall having magnetic force. The connecting member used therein may reduce exposure to the sharp corner on the border or the sharp edge to reduce the risk of injury to the operator. In addition, the filter system may be stacked to increase elasticity in use.

Although the foregoing descriptions and accompanying drawings have disclosed preferred embodiments of the present invention, it is to be understood that various additions, modifications, and replacements are possible in the preferred embodiments of the present invention without departing from the spirit and scope of the principles of the present invention as defined by the appended claims. It will be appreciated by those of ordinary skill in the art that the present invention may be used with many modifications, including forms, structures, arrangements, proportions, materials, components, and assemblies. The embodiments disclosed herein are, therefore, to be considered in all respects as illustrative and not restrictive. The scope of the present invention should be defined by the appended claims, including legal equivalents thereof, and not limited to the foregoing descriptions.

LIST OF REFERENCE NUMERALS

1 Filter system
3 Filter system
10 Frame
12 Fixing groove
14 Fixing element
16 Filter
18 Engaging frame element
18' Engaging frame element
19 Ferromagnetic frame element
19' Ferromagnetic frame element
20 Filter device
22 Magnetic unit
22' Magnetic unit
30 Frame
32 Fixing groove
34 Fixing element
36 Filter
38 Engaging frame element
38' Engaging frame element
39 Ferromagnetic frame element
40 Filter device
42 Magnetic unit
100 Filter
110 First side wall
130 Wave structure
131 Ridge line
140 Snap-fit member
180 Tenon
180' Tenon
182 Mortise
182' Mortise
190 Tenon
192 Mortise
200 Magnetic fixing device
300 Body
301 Direction
311 Top edge
312 Bottom edge
321 first side face
322 Second side face
380' Tenon
382 Mortise
390 Tenon
392 Mortise
400 Clamping portion
410 Top flange
420 Clip plate
430 Bottom flange
450 Recess
460 Guiding element
461 Top projecting strip
462 Guiding inclined plane
500 Magnetic unit
600 Supporting member
603 Third side face
610 Plate
620 Supporting portion
630 Slot
800 Filter device
900 Frame
901 Inner side
903 Insert
910 Border
912 Insertion port
913 Groove
920 Connecting member
921 First inserting member
922 Second inserting member
929 Connecting member body
D1 First distance
D2 Second distance
D3 Third distance
θ angle

What is claimed is:

1. A filter device, comprising:
a filter comprising a first side wall; and
a magnetic fixing device, comprising:
a body, comprising a first side face and a second side face opposite to the first side face, and a top edge and a bottom edge at two opposite sides of the first side face and the second side face;
a clipping portion, comprising a top flange extending from the top edge along a facing direction of the first side face by a first distance and a clip plate extending from an outer edge of the top flange toward the bottom edge by a second distance, the first side wall being clipped between the clip plate and the first side face; and
a magnetic unit being disposed on the second side face.

2. The filter device according to claim 1, wherein the second distance is less than a length of the body in a same direction.

3. The filter device according to claim 1, wherein the clip plate is disposed at intervals along the body.

4. The filter device according to claim 1, wherein
the body further comprises a bottom flange extending from the bottom edge toward the facing direction of the first side face; and
the filter further comprises a snap-fit member disposed on a face that is of the first side wall and that faces the first side face, the snap-fit member being engaged between the top flange and the bottom flange.

5. The filter device according to claim 1, wherein the second side face further comprises a recess, the magnetic unit being engaged in the recess.

6. The filter device according to claim 5, wherein the magnetic fixing device further comprises a top projecting strip extending from the top edge toward the facing direction of the second side face, an edge of the recess being formed by a bottom of the top projecting strip.

7. The filter device according to claim 1, wherein the magnetic unit is disposed at a position adjacent to the top edge.

8. The filter device according to claim 1, wherein the magnetic fixing device further comprises a guiding element, the guiding element comprising a top projecting strip extending from the top edge toward the facing direction of the second side face and a guiding inclined plane extending from an outer edge of the top projecting strip toward the bottom edge and retracting toward the second side face.

9. The filter device according to claim 1, wherein the filter comprises a plurality of wave structures, ridge lines of the wave structures being parallel to a direction in which the first side wall extends.

10. The filter device according to claim 1, further comprising a supporting member disposed on the other side of the magnetic fixing device relative to the filter, the supporting member comprising:
   a plate, comprising a third side face toward the magnetic fixing device; and
   a supporting portion extending from a position that is of the third side face of the plate and that is adjacent to a lower edge toward the filter and crossing the magnetic fixing device to support the first side wall.

11. The filter device according to claim 10, wherein
the supporting member further comprises a slot disposed on a face opposite to the plate and the third side face; and
a side face of a border has an insert that may be correspondingly inserted into the slot.

12. A filter system, comprising:
   a frame, an inner side of the frame having ferromagnetism; and
   the filter device according to claim 1.

13. The filter system according to claim 12, wherein the filter system is stacked.

14. The filter system according to claim 12, wherein the frame comprises at least one engaging frame element and at least one ferromagnetic frame element, the engaging frame element and the ferromagnetic frame element being engaged with each other.

15. The filter system according to claim 14, wherein there are at least two engaging frame elements, one end of the two engaging frame elements being disposed at two ends of the ferromagnetic frame element, respectively.

16. The filter system according to claim 15, wherein the engaging frame element is L-shaped, and the ferromagnetic frame element is strip-shaped.

17. The filter system according to claim 15, further comprising a fixing plate disposed between the two engaging frame elements and located at the other opposite end at which the two engaging frame elements are connected to the ferromagnetic frame element.

18. The filter system according to claim 14, wherein there are at least two engaging frame elements and at least two ferromagnetic frame elements.

19. The filter system according to claim 18, wherein the two engaging frame elements are U-shaped, and the two ferromagnetic frame elements are strip-shaped, the U-shaped engaging frame elements being disposed corresponding to each other, and the two ferromagnetic frame elements being connected to the two U-shaped engaging frame elements respectively to form a rectangular frame.

20. The filter system according to claim 14, wherein corresponding tenons are disposed at connecting ends of the engaging frame element and the ferromagnetic frame element respectively, so that the engaging frame element and the ferromagnetic frame element may be correspondingly engaged.

21. The filter system according to claim 14, wherein a fixing groove is further disposed at an inner wall of the frame and close to a bottom to fix a filter to the frame using a fixing element embedded in the fixing groove.

22. The filter system according to claim 12, wherein the frame comprises:
   a plurality of borders, two ends of each border having insertion ports respectively; and
   a plurality of connecting members connected to the plurality of borders, each connecting member comprising:
   a connecting member body;
   a first inserting member extending outward from one side of the connecting member body; and
   a second inserting member extending outward from the other side of the connecting member body and forming an angle with the first inserting member;
   the first inserting member and the second inserting member of the connecting member being inserted into the insertion port at one end of two adjacent borders respectively to connect the two adjacent borders.

* * * * *